United States Patent
Oike et al.

(10) Patent No.: US 12,208,558 B2
(45) Date of Patent: Jan. 28, 2025

(54) MANUFACTURING METHOD AND MANUFACTURING APPARATUS FOR DELAMINATION CONTAINER

(71) Applicant: NISSEI ASB MACHINE CO., LTD., Nagano (JP)

(72) Inventors: Toshiteru Oike, Nagano (JP); Yoichi Tsuchiya, Nagano (JP); Daizaburo Takehana, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 170 days.

(21) Appl. No.: 17/917,411

(22) PCT Filed: Apr. 6, 2021

(86) PCT No.: PCT/JP2021/014602
§ 371 (c)(1),
(2) Date: Oct. 6, 2022

(87) PCT Pub. No.: WO2021/206082
PCT Pub. Date: Oct. 14, 2021

(65) Prior Publication Data
US 2023/0158728 A1    May 25, 2023

(30) Foreign Application Priority Data

Apr. 6, 2020    (JP) ................... 2020-068177

(51) Int. Cl.
*B29C 49/00*    (2006.01)
*B29C 45/16*    (2006.01)
(Continued)

(52) U.S. Cl.
CPC ............ *B29C 49/071* (2022.05); *B29C 45/16* (2013.01); *B29C 49/062* (2013.01); *B29C 49/22* (2013.01);
(Continued)

(58) Field of Classification Search
CPC .................... B29C 49/071; B29C 45/1684
See application file for complete search history.

(56) References Cited

U.S. PATENT DOCUMENTS 6,554,146 B1    4/2003   DeGroff et al.
6,649,121 B1*   11/2003  Hamamoto ......... B29C 45/1657
                                                     264/513
(Continued)

FOREIGN PATENT DOCUMENTS

JP    2001-105478 A    4/2001
JP    2001-114328 A    4/2001
(Continued)

OTHER PUBLICATIONS

International Search Report and Written Opinion of the International Searching Authority issued in International Patent Application No. PCT/JP2021/014602, dated May 25, 2021, along with an English translation thereof.

(Continued)

*Primary Examiner* — Nahida Sultana
*Assistant Examiner* — Virak Nguon
(74) *Attorney, Agent, or Firm* — GREENBLUM & BERNSTEIN, P.L.C.

(57) ABSTRACT

In a manufacturing method for a delamination container, in a first injection molding, a first recess portion is formed by a first protrusion portion in at least part of a first layer. In a second injection molding, a second recess portion which penetrates the first layer and through which a surface of a second layer is exposed is formed in a preform by inserting a second protrusion portion into the first recess portion. During a blow molding, the second recess portion is stretched to form an air introduction hole in an outer layer of the delamination container.

4 Claims, 9 Drawing Sheets

(51) Int. Cl.
  *B29C 49/02* (2006.01)
  *B29C 49/06* (2006.01)
  *B29C 49/22* (2006.01)
  *B29L 9/00* (2006.01)
  *B29L 31/00* (2006.01)
(52) U.S. Cl.
  CPC .......... *B29C 2049/023* (2013.01); *B29C 2949/0715* (2022.05); *B29C 2949/078* (2022.05); *B29C 2949/0781* (2022.05); *B29C 2949/3008* (2022.05); *B29C 2949/3012* (2022.05); *B29C 2949/3016* (2022.05); *B29C 2949/3022* (2022.05); *B29L 2009/001* (2013.01); *B29L 2031/7158* (2013.01)

(56) References Cited

U.S. PATENT DOCUMENTS

| | | |
|---|---|---|
| 9,067,709 B2 | 6/2015 | Furusawa |
| 2006/0054635 A1 | 3/2006 | Iwahashi et al. |
| 2009/0174102 A1* | 7/2009 | Iwahashi ............. B29C 45/1684 264/40.1 |

FOREIGN PATENT DOCUMENTS

| | | |
|---|---|---|
| JP | 2004-262470 A | 9/2004 |
| JP | 2011-011767 A | 1/2011 |
| JP | 5267901 B2 | 5/2013 |
| JP | 2015-081096 A | 4/2015 |
| JP | 2017-154804 A | 9/2017 |
| JP | 2018-012511 A | 1/2018 |
| JP | 2018-188183 A | 11/2018 |
| JP | 2019-116308 A | 7/2019 |

OTHER PUBLICATIONS

Supplementary European Search Report Issued Nov. 29, 2023 in European family member application No. 21785006.4.

* cited by examiner

MANUFACTURING METHOD AND MANUFACTURING APPARATUS FOR DELAMINATION CONTAINER

BACKGROUND OF THE INVENTION

Field of the Invention

The present invention relates to a manufacturing method and a manufacturing apparatus for a delamination container.

Description of the Related Art

Conventionally, there has been known a resin-made delamination container having a two-layer structure of an inner layer and an outer layer, in which the inner layer is peeled from the outer layer in accordance with discharge of contents thereof. This type of delamination container is also referred to as a delamination bottle or an airless bottle, and is used as, for example, a container of a seasoning liquid such as soy sauce or of a cosmetic liquid of cosmetic products.

At present, in the production of this type of delamination container, an extrusion blow method is generally used, and a stretch blow method is not used as often (see JP 5267901).

For example, from the viewpoint of improving the appearance, dimensional accuracy, physical property strength, and the like of the delamination container and reducing the environmental load of unnecessary materials, applying a blow molding method of a one-stage hot parison type in which an injection molding step to a blow molding step are continuously performed in the production of the delamination container has been considered.

However, in the delamination container, the melting point of the resin material of the outer layer is often set higher than the melting point of the resin material of the inner layer. In the injection molding step for molding a preform having the two-layer structure, when the resin material of outer layer that is at a high temperature is injected after the inner layer is formed, the surface of the inner layer in contact with the resin material of the outer layer is melted and thermally deformed. For this reason, it is extremely difficult to manufacture a delamination container by using a blow molding method of a hot parison type.

In addition, a hole for introducing air is formed in the outer layer of the delamination container, and as a result of the air being introduced to a space between the inner layer and the outer layer through the hole in accordance with the discharge of contents thereof, the inner layer and the outer layer are peeled off from each other in the delamination container. When the delamination container is manufactured by applying the blow molding method of the hot parison type as described above, it is required to reliably form the air introduction hole in the outer layer without penetrating the inner layer.

SUMMARY OF THE INVENTION

A manufacturing method for a delamination container as an aspect of the present invention includes a first injection molding step of injection-molding a first layer of a preform having a bottomed cylindrical shape from a first resin material, a second injection molding step of injecting a second resin material different from the first resin material to form a second layer on an inner peripheral side of the first layer, and a blow molding step of blow-molding, in a state of having residual heat from injection molding, the preform obtained in the second injection molding step, to manufacture the delamination container. In the first injection molding step, a first recess portion is formed by a first protrusion portion in at least part of the first layer. In the second injection molding step, a second recess portion which penetrates the first layer and through which a surface of the second layer is exposed is formed in the preform by inserting a second protrusion portion into the first recess portion. In the blow molding step, the second recess portion is stretched to form an air introduction hole in an outer layer of the delamination container.

Further features of the present invention will become apparent from the following description of exemplary embodiments with reference to the attached drawings.

DESCRIPTION OF THE EMBODIMENTS

Hereinafter, an embodiment of the present invention will be described with reference to the drawings.

In the embodiment, for the sake of more understandable description, structures or elements other than the main parts of the present invention will be described in a simplified or omitted manner. In addition, in the drawings, the same elements are denoted by the same reference signs. To be noted, shapes, dimensions, and the like of each element are schematically illustrated in the drawings, and do not indicate actual shapes, dimensions, and the like.

<Configuration Example of Preform>

Figure 1:
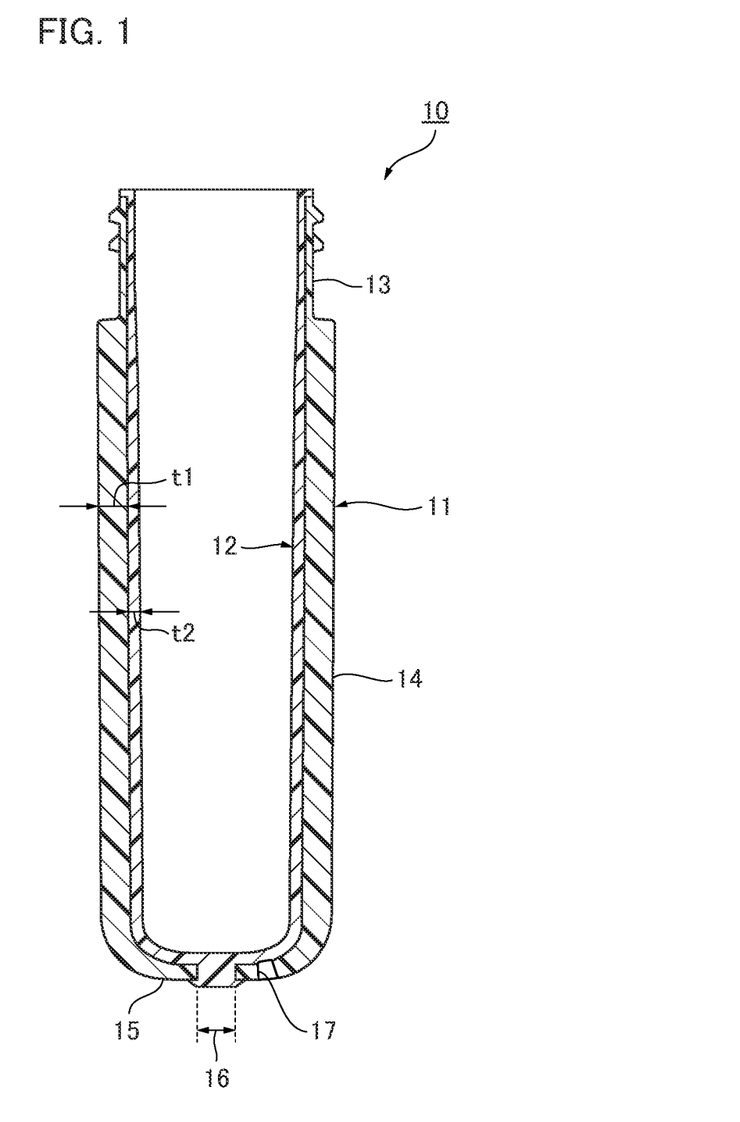
FIG. 1 is a longitudinal section view of a preform of the present embodiment.

First, a configuration example of a preform for a delamination container according to the present embodiment will be described with reference to FIG. 1. FIG. 1 is a longitudinal section view of a preform 10 of the present embodiment. The overall shape of the preform 10 is a bottomed cylindrical shape in which one end side is open and the other end side is closed. The preform 10 includes a body portion 14 formed in a cylindrical shape, a bottom portion 15 that closes the other end side of the body portion 14, and a neck portion 13 formed in an opening on the one end side of the body portion 14.

The preform 10 has a two-layer structure in which a second layer (inner layer) 12 is formed on the inside of a first layer (outer layer) 11. The first layer 11 and the second layer 12 are formed from different thermoplastic resin materials by two-stage injection molding as will be described later. The first layer 11 is formed from a synthetic resin having excellent moldability and transparency. In contrast, the second layer 12 is formed from a synthetic resin having a property (for example, moisture barrier property, gas barrier property, heat resistance, and chemical resistance) for stably storing the contents of the container and suppressing deterioration (oxidation). In addition, the resin material of the first layer 11 is selected to have a melting point higher than that of the resin material of the second layer 12.

Hereinafter, the resin material of the first layer 11 will be also referred to as a first resin material, and the resin material of the second layer 12 will be also referred to as a second resin material.

The combination of the first resin material and the second resin material can be appropriately selected according to the specification of the delamination container. Specific examples of the material include polyethylene terephthalate (PET), polyethylene naphthalate (PEN), polycyclohexanedimethylene terephthalate (PCTA), Tritan ((registered trademark): co-polyester manufactured by Eastman Chemical), polypropylene (PP), polyethylene (PE), polycarbonate (PC), polyethersulfone (PES), polyphenylsulfone (PPSU), polystyrene (PS), cyclic olefin polymer (COP/COC), polymethyl methacrylate (PMMA): acrylic resin, polylactic acid (PLA), and the like.

For example, the first resin material is polyethylene terephthalate (PET), and the second resin material is polypropylene (PP). The melting point of PP is about 160 to 170° C., and the melting point of PET is higher than the melting point of PP and is about 245 to 260° C.

In the body portion 14 of the preform 10, a ratio (t1/t2) of a thickness t1 of the first layer 11 to a thickness t2 of the second layer 12 is preferably 1.5 or more. The thickness ratio is preferably 3.0 or less from the viewpoint of ensuring the transparency of the delamination container to be molded.

In addition, in the bottom portion 15 of the preform 10, an opening portion 16 penetrating the first layer 11 is formed at the center of the bottom portion of the first layer 11. The opening portion 16 of the first layer 11 is closed from the inside by the second layer 12.

In addition, a recess portion 17 for forming an air introduction hole in the delamination container is formed in the bottom portion 15 of the preform 10. The recess portion 17 has, for example, a circular cross section, and is formed at least at one position spaced apart in the radial direction from the center of the bottom portion 15 of the preform 10, but a plurality of recess portions 17 may be formed along the circumferential direction. The depth of the recess portion 17 in the thickness direction of the preform is set to such a dimension in which at least the recess portion 17 penetrates the first layer 11 and the surface of the second layer 12 is exposed in the recess portion 17. To be noted, the recess portion 17 formed in the preform 10 having the two-layer structure may be distinguished from a recess portion (described later) formed only in the first layer 11 and may be referred to as a second recess portion. In addition, the cross section of the recess portion 17 may be a circular shape, an elliptical shape, a polygonal shape, a slit shape, or a shape in which these shapes are combined.

<Configuration Example of Delamination Container>

Figure 2:
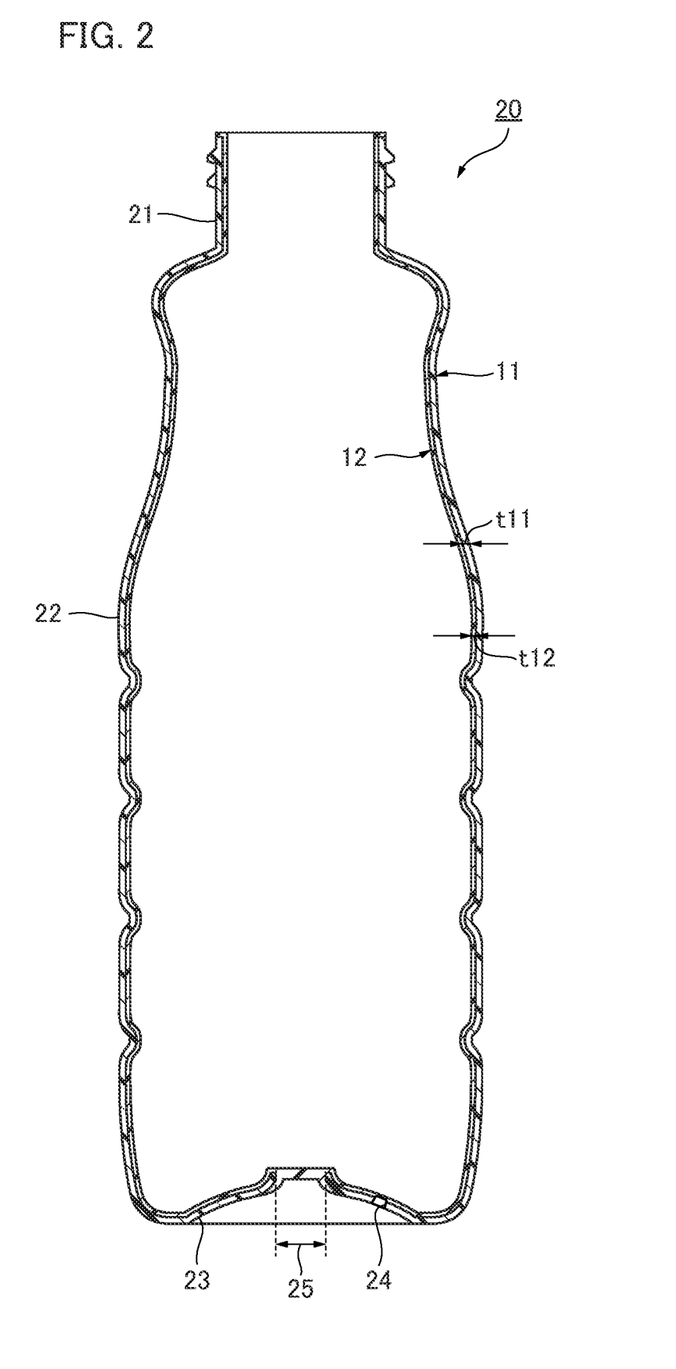
FIG. 2 is a longitudinal section view of a delamination container of the present embodiment.

Next, a configuration example of the delamination container 20 formed from resin according to the present embodiment will be described with reference to FIG. 2. FIG. 2 is a longitudinal section view of the delamination container 20 of the present embodiment.

The delamination container 20 is a bottle-shaped resin container obtained by performing stretch blow molding of the preform 10, and contains, for example, a seasoning liquid such as soy sauce. To be noted, the delamination container 20 may be used to store other contents such as a cosmetic liquid of cosmetic products.

Similarly to the preform 10, the delamination container 20 has a two-layer structure in which the second layer 12 is formed on the inside of the first layer 11. In a body portion 22 of the delamination container 20, a ratio (t11/t12) of a thickness t11 of the first layer 11 to a thickness t12 of the second layer 12 is substantially similar to the ratio (t1/t2) of the thickness in the body portion 14 of the preform 10.

The delamination container 20 includes a neck portion 21 having an opening at an upper end thereof, a cylindrical body portion 22 continuous from the neck portion 21, and a bottom portion 23 continuous from the body portion 22. In the manufacture of the delamination container 20, the body portion 14 and the bottom portion 15 of the preform 10 are expanded by stretch blow to be shaped into the body portion 22 and the bottom portion 23 of the delamination container 20. In addition, at the time of the stretch blow, the recess portion 17 of the preform 10 is stretched, and thus an air introduction hole 24 penetrating the first layer 11 is formed in the bottom portion 23 of the delamination container 20.

In the delamination container 20, the space inside the second layer 12 is filled with the contents. In the delamination container 20, when the contents are discharged from the second layer 12, the air gradually flows into a space between the first layer 11 and the second layer 12 from the air introduction hole 24, and the first layer 11 and the second layer 12 are peeled off. As a result, the volume occupied by the contents in the container can be replaced with air without bringing the contents of the second layer 12 into contact with air, and the contents filled into the second layer 12 can be discharged to the outside of the container.

In addition, similarly to the preform 10, an opening portion 25 (non-laminated portion, single layer portion) penetrating the first layer 11 is formed at the center of the bottom portion 23 of the delamination container 20. The opening portion 25 is filled with the material of the second layer 12 to close the opening portion 25, and the second layer 12 is exposed to the outside of the first layer 11 in the vicinity of the opening portion 25 of the bottom portion 23 of the delamination container 20. When the second layer 12 is exposed to the outside of the first layer 11 at the opening portion 25 of the delamination container 20, the second layer 12 is partially fixed to the first layer 11, and misalignment of the second layer 12 with respect to the first layer 11 is suppressed.

<Description of Manufacturing Apparatus for Delamination Container>

Figure 3:
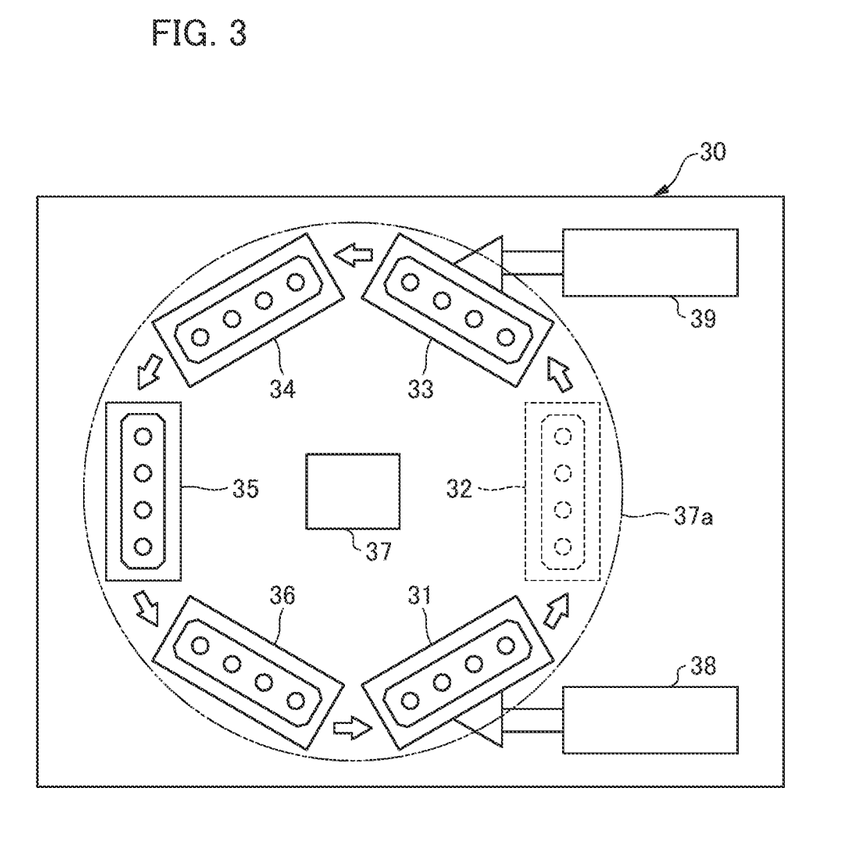
FIG. 3 is a diagram schematically illustrating a configuration of a blow molding apparatus according to the present embodiment.

FIG. 3 is a diagram schematically illustrating a configuration of a blow molding apparatus 30 according to the present embodiment. The blow molding apparatus 30 of the present embodiment is an example of a manufacturing apparatus for the delamination container 20, and employs a hot parison method (also referred to as a one-stage method) in which the delamination container 20 is blow-molded by utilizing residual heat (internal heat amount) from injection molding without cooling the preform 10 to room temperature.

The blow molding apparatus 30 includes a first injection molding unit 31, a first temperature adjustment unit 32, a second injection molding unit 33, a second temperature adjustment unit 34, a blow molding unit 35, a taking-out unit 36, and a conveyance mechanism 37. The first injection molding unit 31, the first temperature adjustment unit 32, the second injection molding unit 33, the second temperature adjustment unit 34, the blow molding unit 35, and the taking-out unit 36 are disposed at positions rotated by the same predetermined angle (for example, 60 degrees) about the conveyance mechanism 37. To be noted, the blow molding apparatus 30 may omit the first temperature adjustment unit 32 (in this case, each molding station is disposed at a position rotated by 72 degrees about the conveyance mechanism 37). In addition, in the first injection molding unit 31 and the second injection molding unit 33, an unillustrated core mold elevation mechanism is provided above the conveyance mechanism 37.

(Conveyance Mechanism 37)

The conveyance mechanism 37 includes a rotating plate (transfer plate) 37a that rotates about a shaft in a direction perpendicular to the paper surface of FIG. 3. On the rotating plate 37a, one or more neck molds 37b (not illustrated in FIG. 3) for holding the neck portion 13 of the preform 10 (or the neck portion 21 of the delamination container 20) are arranged at each predetermined angle. The conveyance mechanism 37 rotates the rotating plate 37a to convey the preform 10 (or the delamination container 20) held by the neck mold 37b to the first injection molding unit 31, the first temperature adjustment unit 32, the second injection molding unit 33, the second temperature adjustment unit 34, the blow molding unit 35, and the taking-out unit 36 in this order. To be noted, the conveyance mechanism 37 can also move up and down the rotating plate 37a, and also performs operations related to mold closing and mold opening (mold releasing) in the first injection molding unit 31 and the second injection molding unit 33.

(First Injection Molding Unit 31)

The first injection molding unit 31 includes a cavity mold 40, a core mold 41, and a hot runner mold 42, and manufactures the first layer 11 of the preform 10 in cooperation with the neck mold 37b conveyed at the time of molding. The cavity mold 40 includes a first cavity mold 40A on the opening side (upper side) and a second cavity mold 40B on the bottom surface side (lower side). A first injection device 38 that supplies a first resin material to the hot runner mold 42 is connected to the first injection molding unit 31. The cavity mold 40 and the hot runner mold 42 are fixed to a machine base of the blow molding apparatus 30 in an integrated state. The core mold 41 is fixed to a core mold elevation mechanism.

Figure 4A:
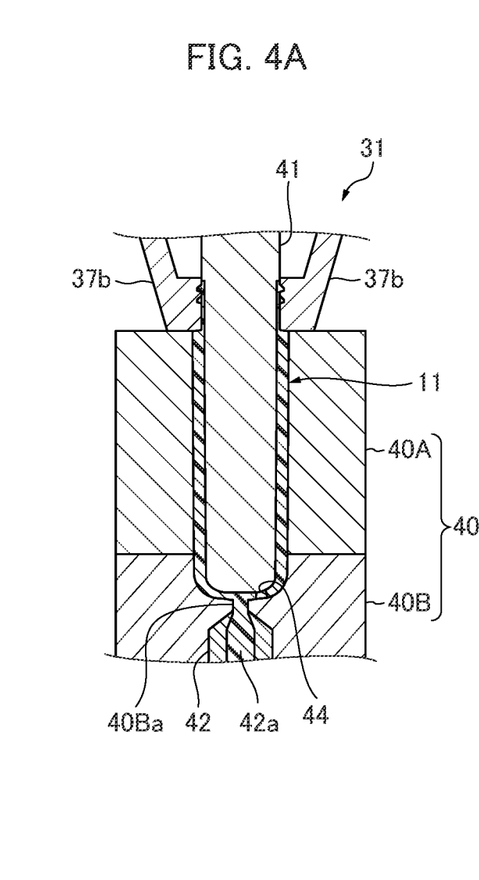
FIGS. 4A to 4C are diagrams illustrating a manufacturing process of the preform of the present embodiment.
Figure 4B:
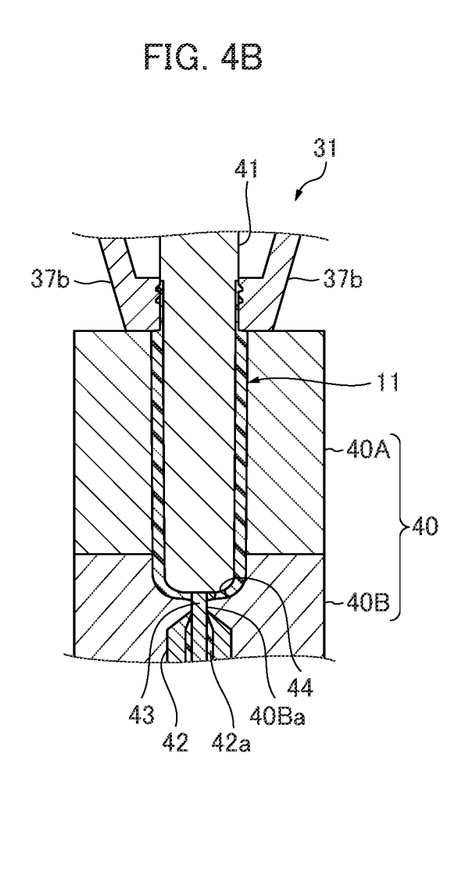
Figure 5A:
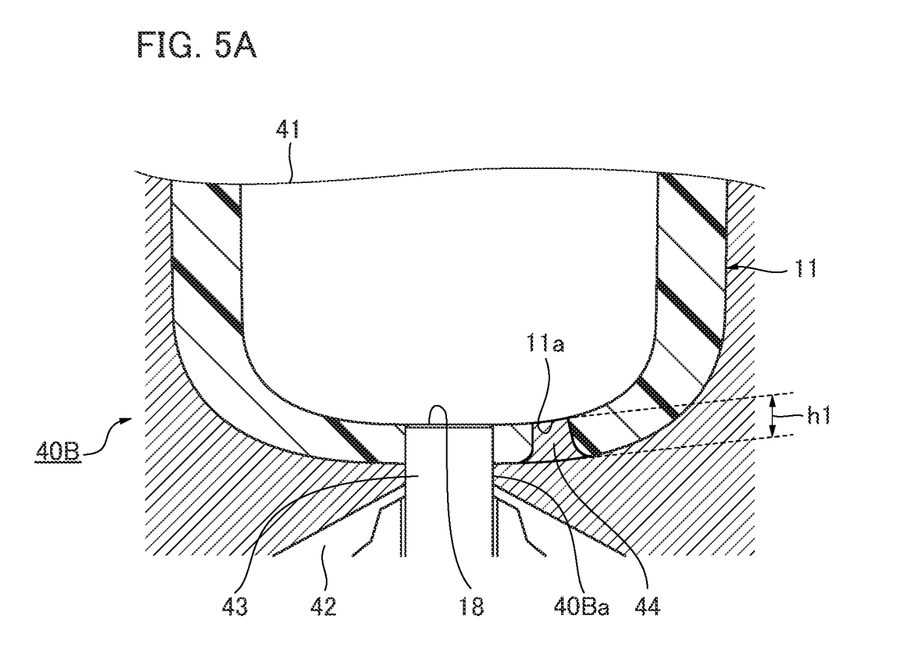
FIG. 5A is a diagram illustrating the vicinity of a bottom portion of a first layer in a first injection molding unit.
Figure 6A:
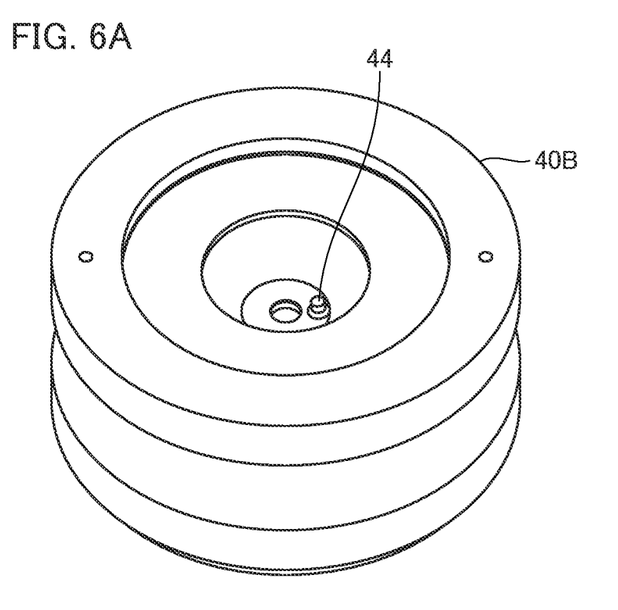
FIGS. 6A and 6B are perspective views of a configuration example of a second cavity mold of the first injection molding unit.

FIGS. 4A and 4B illustrate the first injection molding unit 31 that molds the first layer 11 of the preform 10 of the present embodiment. FIG. 5A is a diagram illustrating the vicinity of the bottom portion of the first layer 11 in the first injection molding unit 31. FIG. 6A is a perspective view illustrating a configuration example of the cavity mold 40 (second cavity mold 40B) of the first injection molding unit 31.

The cavity mold 40 defines (determines) the shape of the outer periphery of the first layer 11. The first cavity mold 40A is a mold facing the opening side of the cavity mold 40 (the side in contact with the neck mold 37b when the mold is closed), and defines the shape of the outer periphery of the body portion of the first layer 11. The second cavity mold 40B is a mold facing the bottom surface side (the side in contact with the hot runner mold 42) of the cavity mold 40, and defines the shape of the outer periphery of the bottom portion of the first layer 11. The second cavity mold 40B further includes a gate portion 40Ba that guides the resin material from the hot runner mold 42 to the cavity surface. In addition, the hot runner mold 42 includes a resin supply portion 42a that introduces the first resin material plasticized (melted) by the first injection device 38 into the second cavity mold 40B. The core mold 41 is a mold that defines the shape of the inner peripheral side of the first layer 11, and is inserted into the inner peripheral side of the cavity mold 40 from above. To be noted, the neck mold 37b conveyed at the time of molding defines the outer shape of the neck portion 13 of the preform 10 (first layer 11).

As illustrated in FIGS. 4A and 4B, in the first injection molding unit 31, the cavity mold 40, the core mold 41, and the neck mold 37b of the conveyance mechanism 37 are closed to form a mold space for the first layer 11. Then, the first resin material is poured from the bottom portion of the mold space described above through the hot runner mold 42, and thus the first layer 11 of the preform 10 is manufactured in the first injection molding unit 31.

A first protrusion portion 44 having a columnar shape (alternatively, a tapered columnar shape or a prismatic shape) is provided at a predetermined position on the upper surface side (cavity surface side) of the second cavity mold 40B facing the outer periphery of the bottom portion of the first layer 11. As illustrated in FIG. 6A, at least one first protrusion portion 44 is disposed at an interval in the radial direction from the center of the bottom portion where the resin supply portion 42a is located. As illustrated in FIG. 5A, a protrusion amount h1 of the first protrusion portion 44 from the cavity standard surface of the second cavity mold 40B (the cavity surface that defines the shape of the lower end side of the outer peripheral surface of the bottom portion of the first layer 11) is substantially the same dimension as the thickness of the first layer 11. Therefore, when the molds of the first injection molding unit 31 are closed, the distal end of the first protrusion portion 44 faces the surface of the core mold 41 (disposed in the vicinity of the surface of the core mold 41). As a result, in the injection molding of the first injection molding unit 31, a recess portion 11a such as a circular shape is formed in the first layer 11 at a position corresponding to the recess portion 17 of the preform 10 by the first protrusion portion 44. The recess portion 11a of the first layer 11 may penetrate the first layer 11, or may have a thin film formed between the core mold 41 and the first protrusion portion 44. To be noted, the recess portion 11a of the first layer 11 formed by the first injection molding unit 31 is also referred to as a first recess portion.

In addition, as illustrated in FIG. 4B, the resin supply portion 42a of the hot runner mold 42 is provided with a valve pin 43 (a bar-shaped member that opens and closes the resin supply portion 42a) that is movable in the axial direction to a position close to the core mold 41. The valve pin 43 is accommodated in the hot runner mold 42 until the mold space is filled with the first resin material, and protrudes to a position closer to the core mold 41 than the opening end on the cavity side of the gate portion 40Ba after the mold space is filled with the first resin material. By such movement of the valve pin 43 during injection molding, a thin film portion 18 in which the thickness of the resin material is smaller than that of the peripheral portion can be formed at the center of the bottom portion of the first layer 11.

In addition, even when the molds of the first injection molding unit 31 are opened, the neck mold 37b of the conveyance mechanism 37 keeps on holding and conveying the first layer 11 of the preform 10 without opening. The number of the preforms 10 simultaneously molded by the first injection molding unit 31 (that is, the number of the delamination containers 20 that can be simultaneously molded by the blow molding apparatus 30) can be appropriately set.

(First Temperature Adjustment Unit 32)

The first temperature adjustment unit 32 includes an unillustrated temperature adjustment mold (a heating pot or a temperature adjustment pot (conditioning pot) that adjusts the temperature of the first layer 11 from the outside, and a heating rod, a temperature adjustment rod (conditioning rod), or an air introduction rod that adjusts the temperature of the first layer 11 from the inside). The first temperature adjustment unit 32 cools (or heats) the first layer 11 in a high-temperature state after injection molding by accommodating the first layer 11 in the temperature adjustment mold maintained at a predetermined temperature. In addition, the first temperature adjustment unit 32 also has a function of adjusting the temperature distribution of the first layer 11 to a predetermined state before being conveyed to the second injection molding unit 33.

(Second Injection Molding Unit 33)

The second injection molding unit 33 includes a cavity mold 50, a core mold 51, and a hot runner mold 52, and performs injection molding of the second layer 12 on the inner peripheral side of the first layer 11 in cooperation with the neck mold 37b conveyed at the time of molding. The cavity mold 50 includes a first cavity mold 50A on the opening side (upper side) and a second cavity mold 50B on the bottom surface side (lower side). A second injection device 39 that supplies a second resin material to the hot runner mold 52 is connected to the second injection molding unit 33.

Figure 4C:
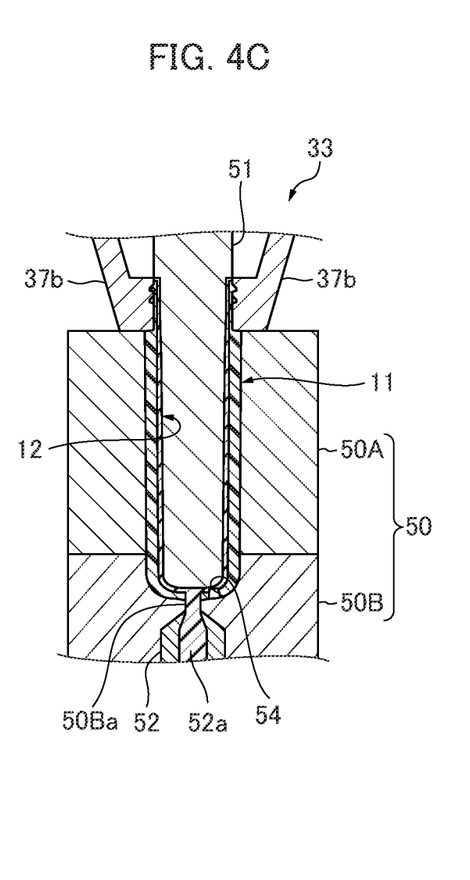
Figure 5B:
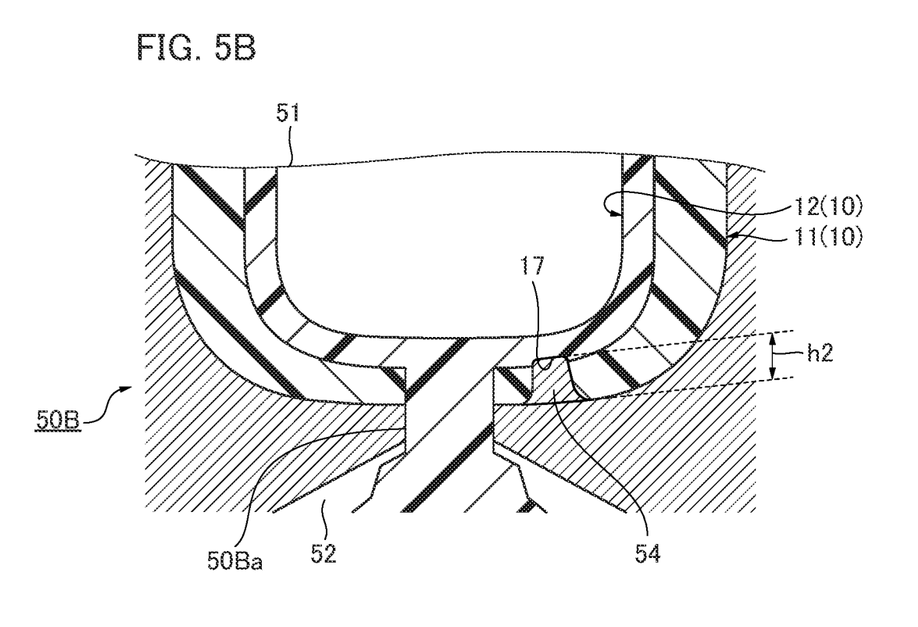
FIG. 5B is a diagram illustrating the vicinity of the bottom portion of the preform in a second injection molding unit.

FIG. 4C illustrates the second injection molding unit 33 that molds the second layer 12 of the preform 10. FIG. 5B is a diagram illustrating the vicinity of the bottom portion of the preform 10 in the second injection molding unit 33.

The cavity mold 50 is a mold that accommodates the first layer 11. The first cavity mold 50A is a mold facing the opening side of the cavity mold 50, and accommodates the body portion of the first layer 11. The second cavity mold 50B is a mold facing the bottom surface side of the cavity mold 50, and accommodates the bottom portion of the first layer 11. The second cavity mold 50B further includes a gate portion 50Ba that guides the resin material from the hot runner mold 52 to the cavity surface. In addition, the hot runner mold 52 includes a resin supply portion 52a that introduces the second resin material plasticized (melted) by the second injection device 39. The core mold 51 is a mold that defines the shape of the inner peripheral side of the second layer 12, and is inserted into the inner peripheral side of the cavity mold 50 from above. The neck mold 37b conveyed at the time of molding defines an upper end surface (top surface) of the neck portion 13 of the preform 10 (second layer 12). Note that the hot runner mold 52 may have a structure including a valve pin like the hot runner mold 42. However, the position of the valve pin when closing the second resin material is set to a position not protruding from the opening end on the cavity side of the gate portion 50Ba.

As illustrated in FIG. 4C, the second injection molding unit 33 accommodates the first layer 11 of the preform 10 injection-molded by the first injection molding unit 31. In a state where the second injection molding unit 33 is closed, a mold space is formed between the inner peripheral side of the first layer 11 and the surface of the core mold 51. In the second injection molding unit 33, the second resin material is poured from the bottom portion of the mold space described above through the hot runner mold 52 to form the preform 10 in which the second layer 12 is formed on the inner peripheral side of the first layer 11.

In addition, on the upper surface side (cavity surface side) of the second cavity mold 50B facing the outer periphery of the bottom portion of the first layer 11, a second protrusion portion 54 having a columnar shape or the like corresponding to the shape of the recess portion 17 of the preform 10 is provided at a predetermined position corresponding to the first protrusion portion 44 of the first injection molding unit 31. The second protrusion portion 54 is inserted into the recess portion 11a of the first layer 11 when the first layer 11 is accommodated in the second injection molding unit 33. As described above, the basic configuration of the protrusion and the like in the second cavity mold 50B is substantially similar to that of the second cavity mold 40B of the first injection molding unit 31.

Here, as illustrated in FIG. 5B, a protrusion amount h2 of the second protrusion portion 54 from the cavity standard surface of the second cavity mold 50B (the cavity surface in contact with a lower end side region of the outer peripheral surface of the bottom portion of the first layer 11) is a larger dimension than the thickness of the first layer 11. That is, the protrusion amount h2 of the second protrusion portion 54 is larger than the protrusion amount h1 of the first protrusion portion 44 (h2>h1). Therefore, when the molds of the second injection molding unit 33 are closed, the distal end of the second protrusion portion 54 penetrates the recess portion 11a of the first layer 11 and protrudes to the inner peripheral side of the first layer 11. By providing the second protrusion portion 54 in the second cavity mold 50B of the second injection molding unit 33, the recess portion 17 can be formed in the bottom portion 15 of the preform 10.

In addition, the protrusion amount h2 of the second protrusion portion 54 is set to be smaller than the thickness of the preform 10. That is, in the injection molding in the second injection molding unit 33, since the second resin material flows into a space between the core mold 51 and the second protrusion portion 54, a hole penetrating the second layer 12 is not formed by the second protrusion portion 54.

(Second Temperature Adjustment Unit 34)

The second temperature adjustment unit 34 includes an unillustrated temperature adjustment mold unit (a heating pot or a temperature adjustment pot (conditioning pot) that adjusts the temperature of the preform 10 from the outside, and a heating rod, a temperature adjustment rod (conditioning rod), or an air introduction rod that adjusts the temperature of the preform 10 from the inside). The second temperature adjustment unit 34 accommodates the preform 10 conveyed from the second injection molding unit 33 in a mold unit maintained at a predetermined temperature to equalize temperature and remove temperature unevenness, and adjusts the temperature of the preform 10 to a temperature suitable for final blowing (for example, about 90° C. to 105° C.). In addition, the second temperature adjustment unit 34 also has a function of cooling the preform 10 in a high temperature state after injection molding.

(Blow Molding Unit 35)

The blow molding unit 35 performs blow molding on the preform 10 whose temperature has been adjusted by the second temperature adjustment unit 34 to manufacture the delamination container 20.

The blow molding unit 35 includes a blow cavity mold which is a pair of split molds corresponding to the shape of the delamination container 20, a bottom mold, a stretching rod, and an air introduction member (all not illustrated). The blow molding unit 35 blow-molds the preform 10 while stretching the preform 10. As a result, the preform 10 is shaped into the shape of the blow cavity mold, and the delamination container 20 can be manufactured.

(Taking-out Unit 36)

The taking-out unit 36 is configured to release the neck portion 21 of the delamination container 20 manufactured by the blow molding unit 35 from the neck mold 37b and take out the delamination container 20 to the outside of the blow molding apparatus 30.

<Description of Manufacturing Method for Container>

Figure 7:
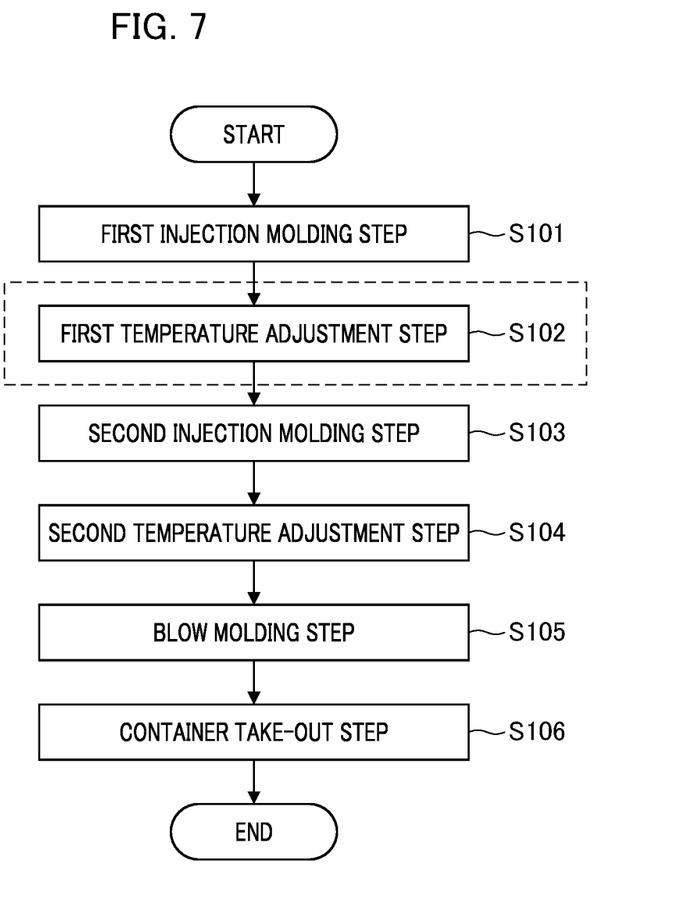
FIG. 7 is a flowchart illustrating steps of a manufacturing method for the delamination container.

Next, a manufacturing method for the delamination container 20 by the blow molding apparatus 30 of the present embodiment will be described. FIG. 7 is a flowchart illustrating steps of the manufacturing method for the delamination container 20.

(Step S101: First Injection Molding Step)

First, as illustrated in FIG. 4A, in the first injection molding unit 31, the first resin material is injected from the first injection device 38 into the mold space formed by the cavity mold 40, the core mold 41, and the neck mold 37b, and the first layer 11 of the preform 10 is formed. At this time, the first protrusion portion 44 forms the recess portion 11a at the bottom portion of the first layer 11.

In the first injection molding unit 31, as illustrated in FIG. 4B, after the first layer 11 of the preform 10 is formed, a step of protruding the valve pin 43 to a position close to the core mold 41 is performed. As a result, the thin film portion 18 having a thickness smaller than that of the peripheral portion is formed at the center of the bottom portion of the first layer 11.

Thereafter, the molds of the first injection molding unit 31 are opened to release the first layer. When the molds of first injection molding unit 31 are opened, the rotating plate 37a of the conveyance mechanism 37 rotates by a predetermined angle, and the first layer 11 of the preform 10 held by the neck mold 37b is conveyed to the first temperature adjustment unit 32 in a state of having residual heat from injection molding.

(Step S102: First Temperature Adjustment Step)

Next, in the first temperature adjustment unit 32, the first layer 11 of the preform 10 is accommodated in the temperature adjustment mold, and cooling of the first layer 11 and adjustment of the temperature distribution (temperature equalization and removal of temperature unevenness) are performed. To be noted, the first temperature adjustment step may be omitted.

After the first temperature adjustment step (or the first injection molding step), the rotating plate 37a of the conveyance mechanism 37 rotates by a predetermined angle, and the first layer 11 having undergone temperature adjustment and held in the neck mold 37b is conveyed to the second injection molding unit 33.

(Step S103: Second Injection Molding Step)

Subsequently, the first layer 11 of the preform 10 is accommodated in the second injection molding unit 33, and injection molding of the second layer 12 is performed.

In the second injection molding unit 33, as illustrated in FIG. 4C, a mold space is formed between the inner peripheral side of the first layer 11 and the surface of the core mold 51 facing the inner periphery of the first layer 11, and the second resin material is injected into the mold space described above from the hot runner mold 52. To be noted, although the thin film portion 18 is formed at the bottom portion of the first layer 11, the thin film portion 18 is broken by the injection pressure of the second resin material to form an opening portion 16 at the bottom portion, and the second resin material is guided from the opening portion 16 to the inner peripheral side of the first layer 11.

Here, the temperature of the second resin material injected in the second injection molding unit 33 is set to a temperature lower than the melting point of the first resin material. In addition, the surface temperature of the first layer 11 when the second resin material is injected in the second injection molding unit 33 is cooled to a temperature equal to or lower than the melting point of the second resin material.

In the second injection molding unit 33, the cavity mold 50 faces the outer peripheral side of the first layer 11, and the shape of the first layer 11 is held by the cavity mold 50 from the outer peripheral side. Therefore, even when the second resin material comes into contact with first layer 11, thermal deformation of first layer 11 can be suppressed.

In addition, in the second injection molding unit 33, since the second protrusion portion 54 penetrates and closes the recess portion 11a of the first layer 11, the recess portion 17 of the preform 10 is not closed by the second resin material. In addition, since the distal end of the second protrusion portion 54 in the second injection molding unit 33 protrudes to the inner peripheral side of the first layer, the recess portion 17 of the preform 10 formed by the second protrusion portion 54 has a shape that penetrates the first layer 11 and the surface of the second layer 12 is exposed in the recess portion 17.

As described above, the preform 10 in which the second layer 12 is formed on the inner peripheral side of the first layer 11 is manufactured by the first injection molding step and the second injection molding step.

Thereafter, when the molds of the second injection molding unit 33 are opened, the rotating plate 37a of the conveyance mechanism 37 rotates by a predetermined angle, and the preform 10 held by the neck mold 37b is conveyed to the second temperature adjustment unit 34 in a state of having residual heat from injection molding.

(Step S104: Second Temperature Adjustment Step)

Subsequently, in the second temperature adjustment unit 34, the preform 10 is accommodated in the temperature adjustment mold unit, and temperature adjustment for bringing the temperature of the preform 10 closer to a temperature suitable for final blowing is performed. Thereafter, the rotating plate 37a of the conveyance mechanism 37 rotates by a predetermined angle, and the preform 10 having undergone temperature adjustment and held in the neck mold 37b is conveyed to the blow molding unit 35.

(Step S105: Blow Molding Step)

Subsequently, in the blow molding unit 35, blow molding of the delamination container 20 is performed.

First, the blow cavity mold is closed to accommodate the preform 10 in the mold space, and the air introduction member (blow core) is lowered, so that the air introduction member abuts the neck portion 13 of the preform 10. Then, the stretching rod is lowered to press the bottom portion 15 of the preform 10 from the inside, and blow air is supplied from the air introduction member while performing longitudinal axis stretching as necessary, and thus the preform 10 is stretched in the lateral axis. As a result, the preform 10 is shaped by being bulged so as to be in close contact with the mold space of the blow cavity mold, and is thus blow-molded into the delamination container 20.

(Step S106: Container Take-out Step)

When the blow molding is completed, the blow cavity mold is opened. As a result, the delamination container 20 becomes movable from the blow molding unit 35.

Subsequently, the rotating plate 37a of the conveyance mechanism 37 rotates by a predetermined angle, and the delamination container 20 is conveyed to the taking-out unit 36. In the taking-out unit 36, the neck portion 21 of the delamination container 20 is released from the neck mold 37*b*, and the delamination container 20 is taken out to the outside of the blow molding apparatus 30.

Thus, one cycle in the manufacturing method for the delamination container ends. Thereafter, by rotating the rotating plate 37*a* of the conveyance mechanism 37 by a predetermined angle, the respective steps of S101 to S106 described above are repeated. To be noted, during the operation of the blow molding apparatus 30, six sets of the delamination containers 20 are manufactured in parallel at a time difference of one step each.

In addition, due to the structure of the blow molding apparatus 30, the waiting times of the first injection molding step, the first temperature adjustment step, the second injection molding step, the second temperature adjustment step, the blow molding step, and the container take-out step are the same. Similarly, the conveyance times between the steps are also the same.

Hereinafter, effects of the blow molding apparatus and the blow molding method of the present embodiment will be described.

In the present embodiment, the first layer 11 (outer layer) of the preform 10 is molded in the first injection molding step, and the second layer 12 (inner layer) is injection-molded on the inside of the first layer 11 from the opening portion 16 of the first layer 11 in the second injection molding step to manufacture the preform 10 having a two-layer structure. According to the present embodiment, the outer layer can be first formed from a resin material having a high melting point, and then the inner layer can be formed from a resin material having a melting point lower than that of the outer layer. That is, the injection molding of the inner layer can be continuously performed while the outer layer has the residual heat from the injection molding, so that the preform 10 having the two-layer structure suitable for the specification of the delamination container 20 can be manufactured. In the present embodiment, since the preform 10 having a two-layer structure is released in a state where both the outer layer and the inner layer have residual heat from injection molding, it is possible to obtain the preform 10 suitable for manufacturing the delamination container 20 by a blow molding method of a hot parison type.

Further, in the present embodiment, the preform 10 having the two-layer structure described above is subjected to stretch blow molding in a state where the preform 10 has the residual heat from injection molding to manufacture the delamination container 20. Therefore, in the present embodiment, the delamination container 20 having excellent aesthetic appearance, physical property strength, and the like can be manufactured by a blow molding method of a hot parison type. As compared with blow molding of a cold parison type, in the present embodiment, it is not necessary to cool the produced preform 10 to near room temperature, and the step of reheating the preform 10 is also unnecessary. Therefore, according to the present embodiment, a series of steps from injection molding of the preform 10 to blow molding of the delamination container 20 can be completed in a relatively short time, and the delamination container 20 can be manufactured in a shorter cycle.

In addition, in the present embodiment, the first protrusion portion 44 forms the recess portion 11*a* in the first layer 11 in the first injection molding step. Then, in the second injection molding step, the second protrusion portion 54 having a larger protrusion amount than the first protrusion portion 44 penetrates the recess portion 11*a* of the first layer 11 to form the recess portion 17 in the bottom portion 15 of the preform 10. As a result, in the delamination container 20, the air introduction hole 24 that penetrates the first layer 11 and reaches the surface of the second layer 12 can be reliably formed.

The present invention is not limited to the above embodiment, and various improvements and design changes may be made without departing from the gist of the present invention.

Figure 6B:
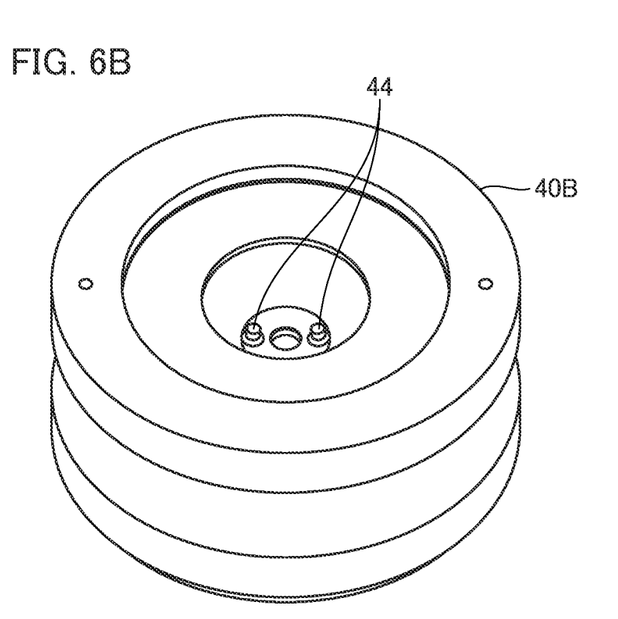

In the above embodiment, an example in which one recess portion 17 is provided in the bottom portion 15 of the preform 10 has been described, but for example, a plurality of recess portions 17 may be formed. FIG. 6B illustrates an example in which the first protrusion portions 44 are provided at two positions in the second cavity mold 40B of the first injection molding unit 31. In the example of FIG. 6B, the two first protrusion portions 44 are arranged at point-symmetrical positions with respect to the central axis at an interval of 180°. To be noted, the number of the first protrusion portions 44 may be three or more. In this case, it is preferable that the first protrusion portions 44 are arranged in a point-symmetric positional relationship with respect to the central axis.

According to the above configuration, the unevenness of the flow of the resin in the circumferential direction during the injection molding is further reduced. To be noted, in the case of the above configuration, it is also necessary to arrange second protrusion portions 54 at positions similar to the first protrusion portions 44 also in the second injection molding unit 33.

Figure 8A:
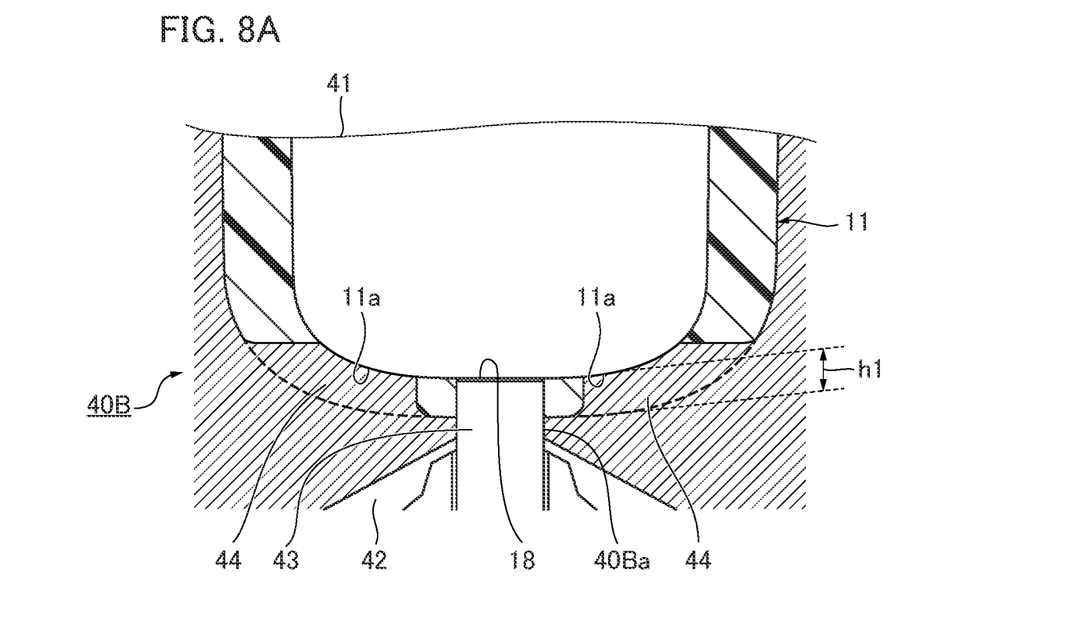
FIGS. 8A and 8B are diagrams illustrating a modification example of FIGS. 5A and 5B.
Figure 8B:
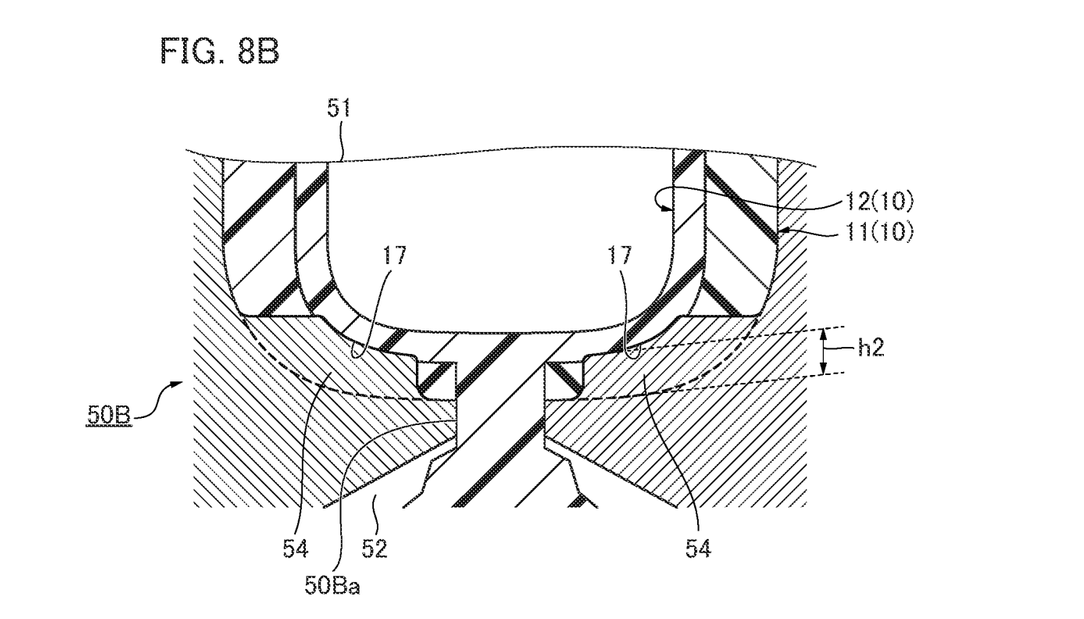
Figure 9:
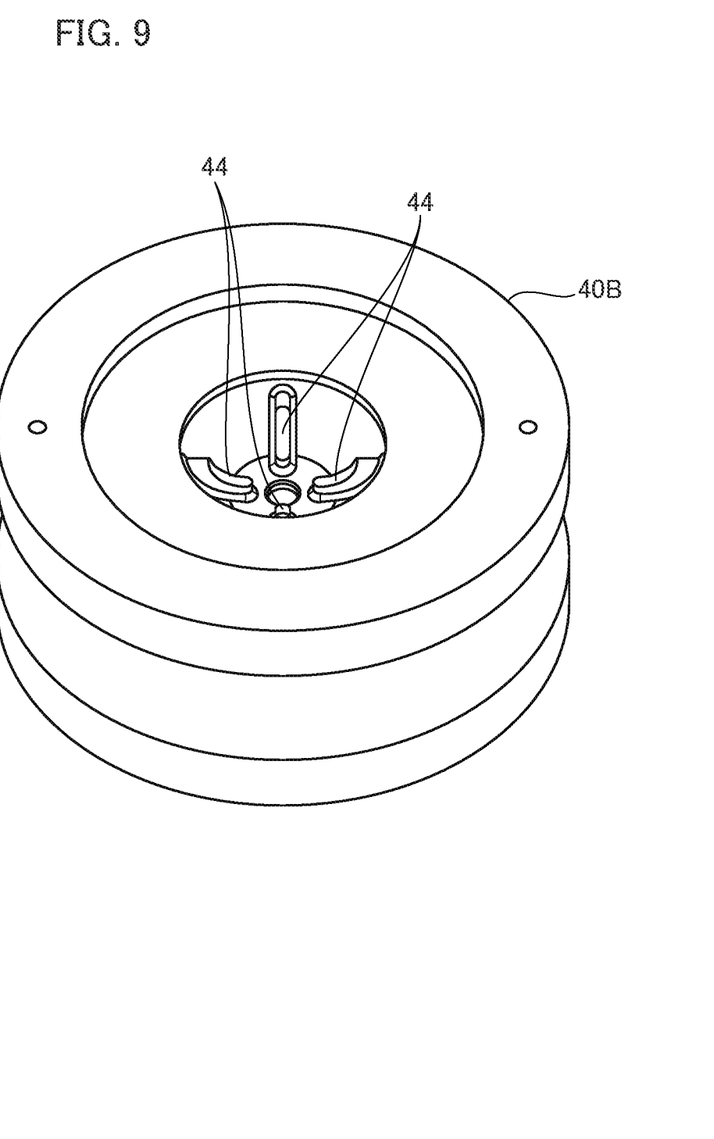
FIG. 9 is a diagram illustrating a modification example of FIGS. 6A and 6B.

In the above embodiment, the example in which the first protrusion portion 44 and the second protrusion portion 54 are formed as pins having columnar shapes or the like has been described, but the shapes of the first protrusion portion 44 and the second protrusion portion 54 are not limited to the above embodiment. For example, as illustrated in FIGS. 8A, 8B, and 9, each of the first protrusion portion 44 and the second protrusion portion 54 may be formed in a rib shape extending radially, and a slit-shaped recess portion 17 may be formed in the bottom portion 15 of the preform 10.

In addition, the embodiment disclosed herein should be considered in all respects as illustrative and not restrictive. The scope of the present invention is indicated not by the above description but by the claims, and it is intended that meanings equivalent to the claims and all modifications within the scope are included.

The invention claimed is:

1. A manufacturing method for a delamination container, the manufacturing method comprising:
   injection-molding a first layer of a preform having a bottomed cylindrical shape from a first resin material as a first injection molding;
   injecting a second resin material different from the first resin material to form a second layer on an inner peripheral side of the first layer as a second injection molding; and
   blow-molding, in a state of having residual heat from injection molding, the preform obtained during the second injection molding, to manufacture the delamination container,
   wherein, during the first injection molding, a first recess portion is formed by a first protrusion portion in at least part of the first layer,
   during the second injection molding, a second recess portion which penetrates the first layer and through which a surface of the second layer is exposed is formed in the preform by inserting a second protrusion portion into the first recess portion, during the blow molding, the second recess portion is stretched to form an air introduction hole in an outer layer of the delamination container, during the first injection molding, a thin film portion having a thickness is formed in part of the first layer, and during the second injection molding, the second resin material is guided to the inner peripheral side of the first layer by breaking the thin film portion by injection of the second resin material.

2. The manufacturing method for the delamination container according to claim 1, wherein a protrusion amount of the second protrusion portion toward an inner peripheral side of the preform is larger than a protrusion amount of the first protrusion portion toward the inner peripheral side of the preform.

3. The manufacturing method for the delamination container according to claim 1, wherein the first resin material has a higher melting point than the second resin material.

4. A manufacturing apparatus for a delamination container, the manufacturing apparatus comprising:

a first injection molding unit configured to injection-mold a first layer of a preform having a bottomed cylindrical shape from a first resin material as a first injection molding;

a second injection molding unit configured to inject a second resin material different from the first resin material to form a second layer on an inner peripheral side of the first layer as a second injection molding; and a blow molding unit configured to blow-mold, in a state of having residual heat from injection molding, the preform obtained by the second injection molding portion, to manufacture the delamination container, wherein the first injection molding unit includes a first protrusion portion that forms a first recess portion in at least part of the first layer, the second injection molding unit includes a second protrusion portion that is inserted into the first recess portion, the second protrusion portion forms, in the preform, a second recess portion, which penetrates the first layer and through which a surface of the second layer is exposed, the blow molding unit stretches the second recess portion to form an air introduction hole in an outer layer of the delamination container, in the first injection molding, a thin film portion having a thickness is formed in part of the first layer, and in the second injection molding, the second resin material is guided to the inner peripheral side of the first layer by breaking the thin film portion by injection of the second resin material.

* * * * *